M. FRANK AND H. FROEHLICH.
DOLL EYE ACTUATING DEVICE.
APPLICATION FILED JAN. 18, 1919.
1,309,884.
Patented July 15, 1919.
2 SHEETS—SHEET 1.
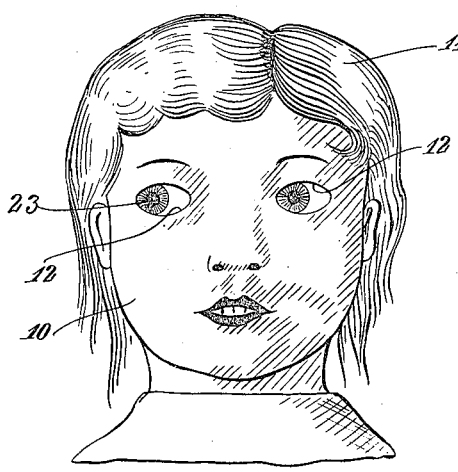
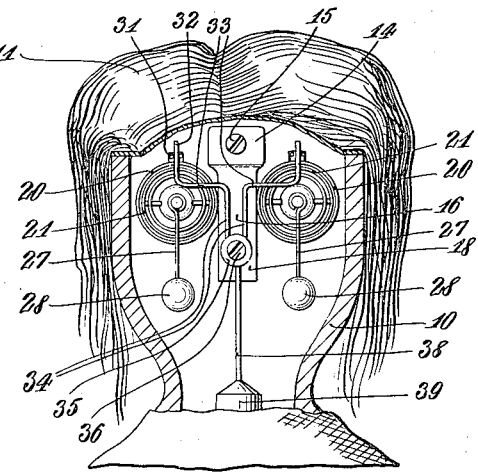
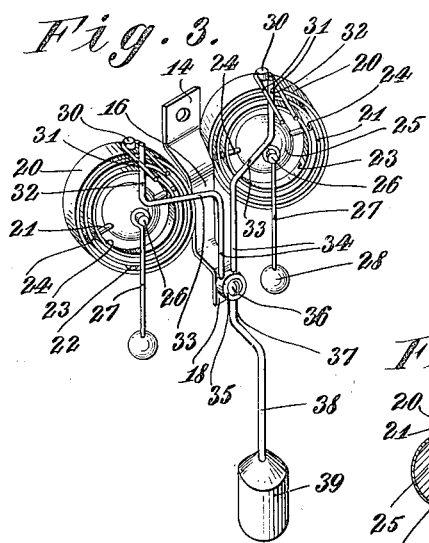
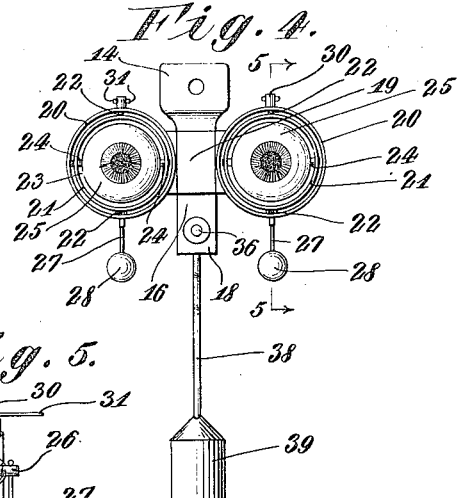
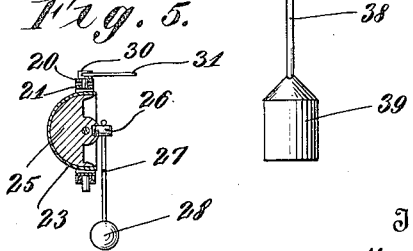
Inventors
Max Frank
Hugo Froehlich
By their Attorney
Frederick Myers

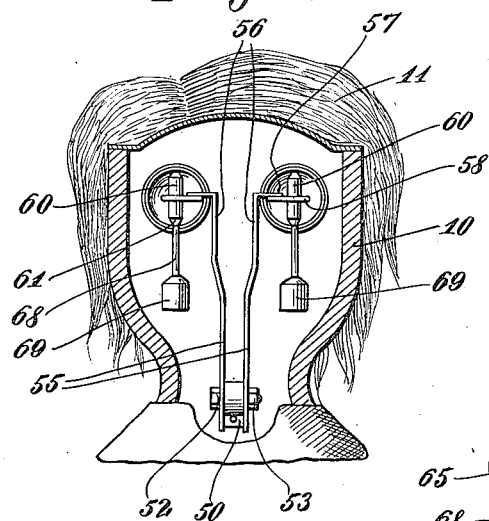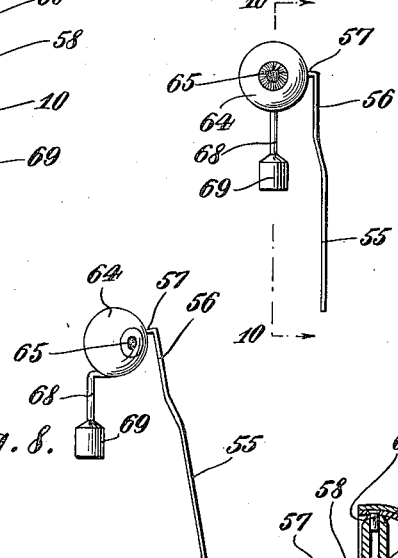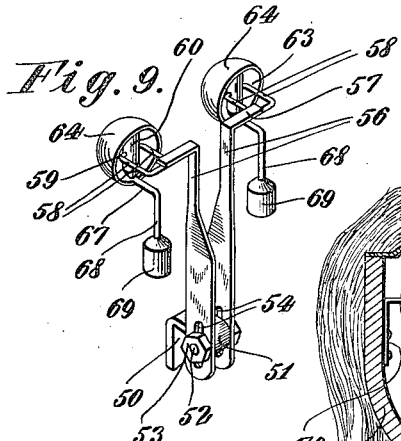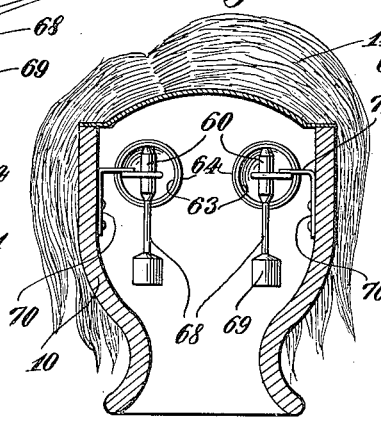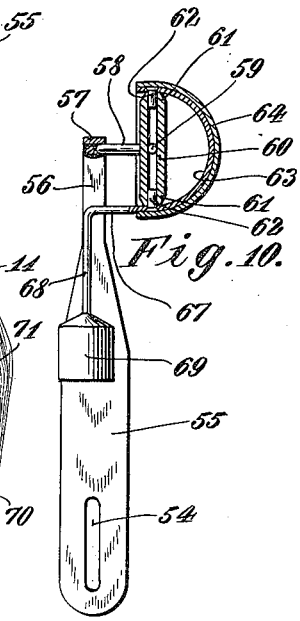

UNITED STATES PATENT OFFICE.

MAX FRANK, OF NEW YORK, AND HUGO FROEHLICH, OF BROOKLYN, NEW YORK.

DOLL-EYE-ACTUATING DEVICE.

1,309,884. Specification of Letters Patent. Patented July 15, 1919.

Application filed January 18, 1919. Serial No. 271,815.

*To all whom it may concern:*

Be it known that I, MAX FRANK, a citizen of Austria, residing at New York, county of New York, and State of New York, and I, HUGO FROEHLICH, a citizen of Germany, residing at Brooklyn, county of Queens, and State of New York, have invented certain new and useful Improvements in Doll-Eye-Actuating Devices, of which the following is a specification.

This invention relates to improvements in means for actuating the eyes of dolls in such manner as to simulate the action of natural eyes.

The principal action of the invention is to provide means which operate automatically in moving the eyes, giving them the appearance of raising and lowering, and other means for causing the eyes to roll laterally, so as to present the pupil at either end of the eye opening.

A further object is to provide such means in forms which are not easily liable to become disordered and are attachable within the hollow interior of the head of a doll.

These and other like objects are attained by the novel construction and combination of parts hereinafter described and shown in the accompanying drawings, forming a material part of this disclosure, and in which—

Figure 1 is a front elevational view showing the head of a conventional type of doll and indicating the application of the invention.

Fig. 2 is a rear plan view of the same, a portion of the doll head representing the skull being removed in order to disclose the interior.

Fig. 3 is a perspective view looking from the rear of the apparatus.

Fig. 4 is a front plan view of the same.

Fig. 5 is a vertical sectional view taken on line 5—5 of Fig. 4.

Fig. 6 is a sectional rear view of a doll's head showing a modified construction of the eye operating means.

Fig. 7 is a front elevational view showing a single eye unit in side elevation.

Fig. 8 is a perspective view of the same, parts being turned at an angle.

Fig. 9 is a perspective view showing the eye operating mechanism assembled for a pair of eyes.

Fig. 10 is an enlarged vertical sectional view taken on line 10—10 of Fig. 7, and, Fig. 11 is a vertical sectional view showing a further modification in the eye operating structure.

In the drawings, the numeral 10 indicates the upper front part or head of a doll, indicating a female figure, provided with hair 11, openings 12 for the eyes appearing in their usual position.

Secured in the interior of the hollow structure, at a point substantially central of and above the eyes, is a bracket having a footing 14 held by the screw 15, and extending inwardly from this footing is an offset plate 16, terminating in a further inwardly extending offset plate 18.

Secured to the element 16 is a transverse plate 19, having attached to its outer ends, rings 20, their inner edges being closely adjacent to the interior of the doll head chamber.

Other smaller rings 21, arranged concentrically therein, are journaled in a vertical axis on pins 22 set in the outer rings while a third pair of rings 23, are journaled upon other pins 24 set in a horizontal axis, these inner rings are formed around the spheres 25 simulating eye balls, the projections 26 of which are directed outwardly as usual.

Extending oppositely from the ball 25 into the hollow head are pins 27 engaging the projections 26 ending in weights 28 in such manner that as the weights are oscillated front or back within the hollow figure, the eye balls 25 are caused to turn upon the pins 24, giving the effect of opening or closing the eyes as the cornea is raised or lowered by action of the pendant weight.

The upper pair of the vertical pins 22, pass through the outer rings 20, forming extensions 30 having firmly secured to them the bight of looped arms 31 which extend toward the rear as best shown in Fig. 3.

Engaged between these arms 31, are the upper ends 32, of vertical rods 33, the same being bent to extend in parallel as at 34, their lower ends being fixed in a collar 35, pivoted on a screw 36 set in the plate extension 18, while on the opposite lower side of the collar 35, is engaged a rod 37 having an offset extension 38 supporting a weight or pendulum 39.

In the modifications shown in Figs. 6 to 10 inclusive, a bracket 50 is secured interiorly of the doll head 10 near the lower or neck portion thereof, and passing transversely through the raised outstanding circular boss 51 of the bracket is a bolt 52 secured by a nut 53.

This bolt also adjustably engages in slots 54 formed in the lower end of plates 55, having upper attenuated ends 56, bent slightly outward or away from each other, and terminating in out-turned angular portions 57, these outer ends being fixed to pairs of wire loops 58, the oppositely formed inner portions 59 of which pass freely through openings formed centrally in tubular posts 60, having beveled ends 61.

Engaged in the ends of the tubular studs 60 are opposed alined pins 62, fixed in the top and bottom interiorly of the hemispherical shells 63 which are inclosed in casings 64, colored and formed to represent an eyeball, having iris 65 at their center.

Rigidly engaged at the lower ends of the tubular posts 60, are arms 67 extending horizontally outward for a short distance and then turned at right angles downward, the same supporting weights 69, which normally hang pendant, and which cause the eyes to roll up or down whenever the doll head is moved from a truly vertical position either forward or back, the pivoting effect taking place upon the inner element 59 of the loop 58.

At the same time, the eyeball being mounted upon the pins 62, are free to move on a vertical axis so as to present a laterally rolling effect, due to the fact that the pendant weights 65, hang considerably rearward of the axis of the pivots 61.

In the modification shown in Fig. 11, a pair of brackets 70 are secured upon the interior of the hollow doll head at a point substantially representing the cheek portions thereof, having inwardly extending right angle projections 71, engaged with the loops 58, upon which are pivoted the tubular posts 60, actuated by the pendant weight 69, connected and attached in the manner previously described, the only point of difference being in the formation of the loop supports.

From the foregoing it will be seen that as the upper portion of the doll, or head thereof, is tilted at an angle sidewise, the eyes will be caused to rotate upon a vertical axis, giving the appearance of looking from the corners, while if the head be moved forward or back the eyes rise and fall, the combination of movements give an action strongly simulative of the movements of the eyes in a person or animal. As all parts are entirely inclosed, if the mechanism be made of suitable material, in a proper manner, the same are protected from injury and will operate an indefinite long period of time.

It will be obvious that other minor modifications may be made without departing from the general scope in the claims hereto amended.

Having thus described our invention, what we claim as new and desire to secure by Letters Patent, is—

1. In a doll eye mechanism, the combination with the hollow head of a doll having openings simulating eyes, of a pair of eyeballs, gimbal joint mountings for said eye balls, and a plurality of counterweights, one pair of said weights for causing the eyeballs to oscillate for simulating the opening and closing of the eyes, and the others of said counter weights being so arranged as to cause said eyeballs to move simultaneously laterally in one or the other directions upon the corresponding movement of said head to simulate the lateral movement of the eye pupils.

2. In a doll eye actuating mechanism, the combination with the head of a doll having openings for the eyes, of a bracket fixed within said hollow head, a pair of rings fixed upon said bracket, said rings extending laterally therefrom in close proximity to the mentioned openings for the eyes, concentric inner rings pivotally mounted on a vertical axis in said outer rings, eyeballs pivotally mounted in said inner rings upon a horizontal axis, weights attached to said eyeballs whereby they are caused to move upon their horizontal pivots, a second weight, and connections from said second weight adapted to rotate said eyeballs in a different plane from the first named weights, whereby said eyeballs are caused to move laterally upon their vertical pivots.

3. In a doll eye actuating device, the combination with the hollow head of a doll having openings for the eyes, of a bracket secured above and centrally between the eyes, a pair of rings supported upon each side of said bracket in front of the mentioned eye openings, a second pair of rings arranged concentrically within the first named rings, vertical pivotal connections between said rings, a third pair of rings concentric within the second named rings, horizontal pivotal connections between said second and third rings, eyeballs pivotally mounted in said inner rings, projections extending rearwardly from said eyeballs, weighted connections engaged with said projections, whereby said eyeballs are caused to rise and lower according to the position of the head of the doll, forked crank connections fixed upon the uppermost of said vertical connections between the outer and center rings, vertical rods engaging with said fork connections, a sleeve pivoted upon the lower end of said bracket with which said vertical rods are engaged, and a weight extending downwardly from said sleeve whereby said eyeballs are caused to oscillate in a vertical axis when said doll head is moved laterally.

4. In a doll eye actuating mechanism, the combination with a pair of hollow semi-spherical eyes, gimbal joint mountings for said eyes, pins fixed in the top and bottom interiorly of each of said eyes, tubular posts engaging at each end, with said pins, whereby each of said eyes may rotate upon vertical axes, supports upon which said posts are pivotally engaged at their centers, means for securing said supports interiorly of the doll head, arms rigidly engaged with said posts, said arms extending horizontally rearward, and pendant weights attached to the extremity of said arms, said weights being adapted to actuate said eyes upon horizontal axes, and also rotate said eyes upon vertical axes.

5. In a doll eye actuating mechanism, the combination with a pair of semi-spherical hollow shells simulating eyes, gimbal joint-mountings for said shells, posts engaged in said eyes in such manner that the eyes may pivot upon a vertical axis thereon, supports for said posts, permitting the eyes to pivot upon a horizontal axis, said posts being pivotally secured within the doll's head structure, arms extending horizontally rearward from said posts, and weights engaged at the extremities of said arms, said weights being adapted to cause said arms to rotate upon their vertical axes and also upon their horizontal axes, each of said eyes being independently mounted and actuated.

In testimony whereof we have affixed our signatures.

MAX FRANK.
HUGO FROEHLICH.